(12) United States Patent
Franta

(10) Patent No.: US 8,540,200 B2
(45) Date of Patent: Sep. 24, 2013

(54) SOFT PADEYE

(76) Inventor: John E. Franta, Mesa, AZ (US)

(*) Notice: Subject to any disclaimer, the term of this patent is extended or adjusted under 35 U.S.C. 154(b) by 0 days.

(21) Appl. No.: 13/199,692

(22) Filed: Sep. 7, 2011

(65) Prior Publication Data

US 2012/0056047 A1    Mar. 8, 2012

Related U.S. Application Data

(60) Provisional application No. 61/402,745, filed on Sep. 7, 2010.

(51) Int. Cl.
*A47F 5/08* (2006.01)
(52) U.S. Cl.
USPC ........ 248/231.9; 248/499; 248/500; 410/101; 411/178; 411/395
(58) Field of Classification Search
USPC .................. 248/231.9, 231.91, 56, 499, 500; 296/167; 410/101, 110; 411/178, 366, 383, 411/395, 400; 16/2.1
See application file for complete search history.

(56) References Cited

U.S. PATENT DOCUMENTS

| | | | | |
|---|---|---|---|---|
| 4,295,765 A * | 10/1981 | Burke | ........................... | 410/101 |
| 4,630,982 A * | 12/1986 | Fenner | ........................... | 410/102 |
| 5,080,542 A * | 1/1992 | Sheahan | ........................... | 411/34 |
| 5,156,616 A * | 10/1992 | Meadows et al. | ............. | 606/232 |
| 5,348,433 A * | 9/1994 | Watson | ........................... | 411/347 |

OTHER PUBLICATIONS

Loopblock.com, website—one page, Dec. 20, 2010.
Equiplite Brochure—three pages.
Kohlhoff loop padeyes—one sheet, Feb. 2010.

* cited by examiner

*Primary Examiner* — Gwendolyn Baxter
(74) *Attorney, Agent, or Firm* — Ronald R. Kilponen

(57) ABSTRACT

A soft padeye is shown and disclosed. The soft padeye has a spindle that runs through the deck of the ship or boat or other surface. The fastener is then screwed on the shaft and secured against the deck securing the fastener and the spindle to the deck. The spindle has a hole through it allowing the passage of a loop of line. The loop remains above deck while the two ends of the loop are fed through the shaft and tied in a knot that will not pull through the shaft. This allows the user to secure line or other hardware to the loop.

3 Claims, 4 Drawing Sheets

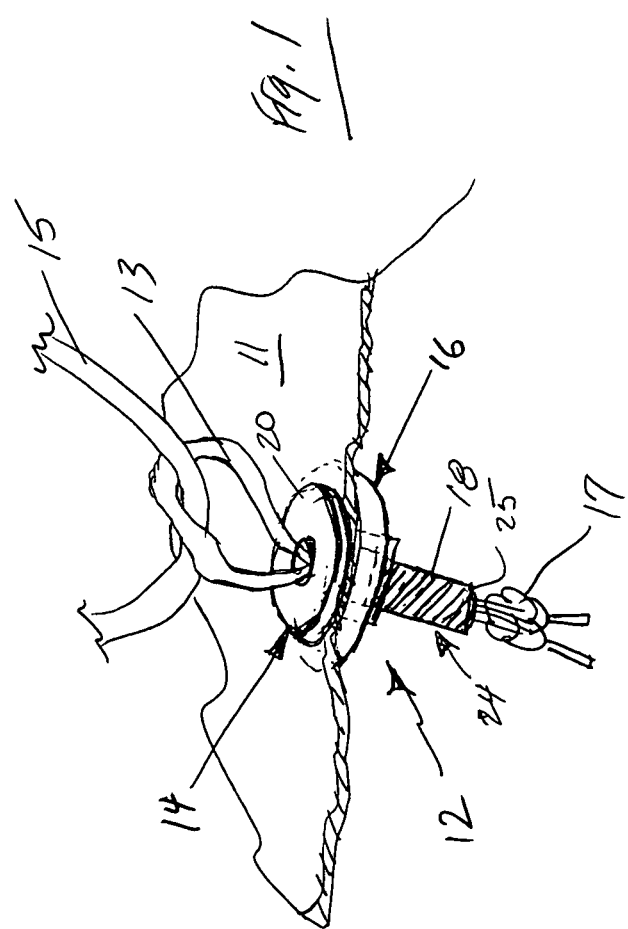

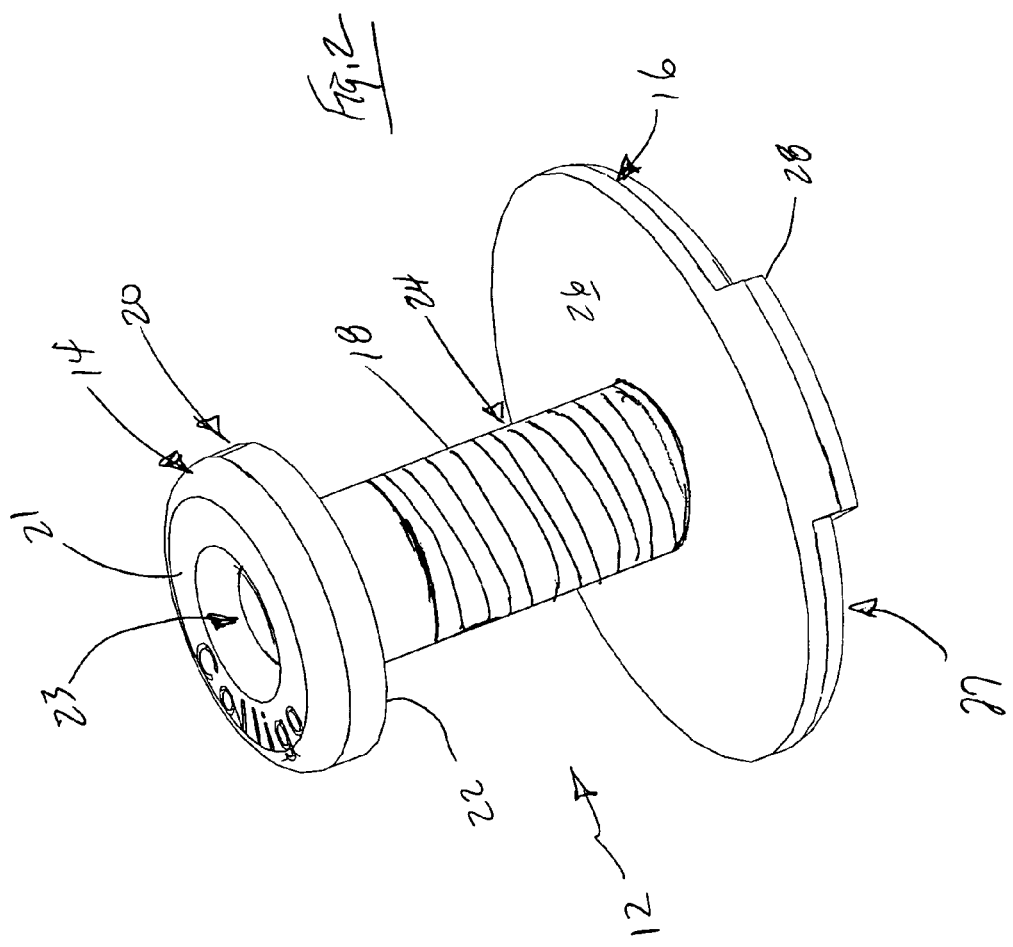

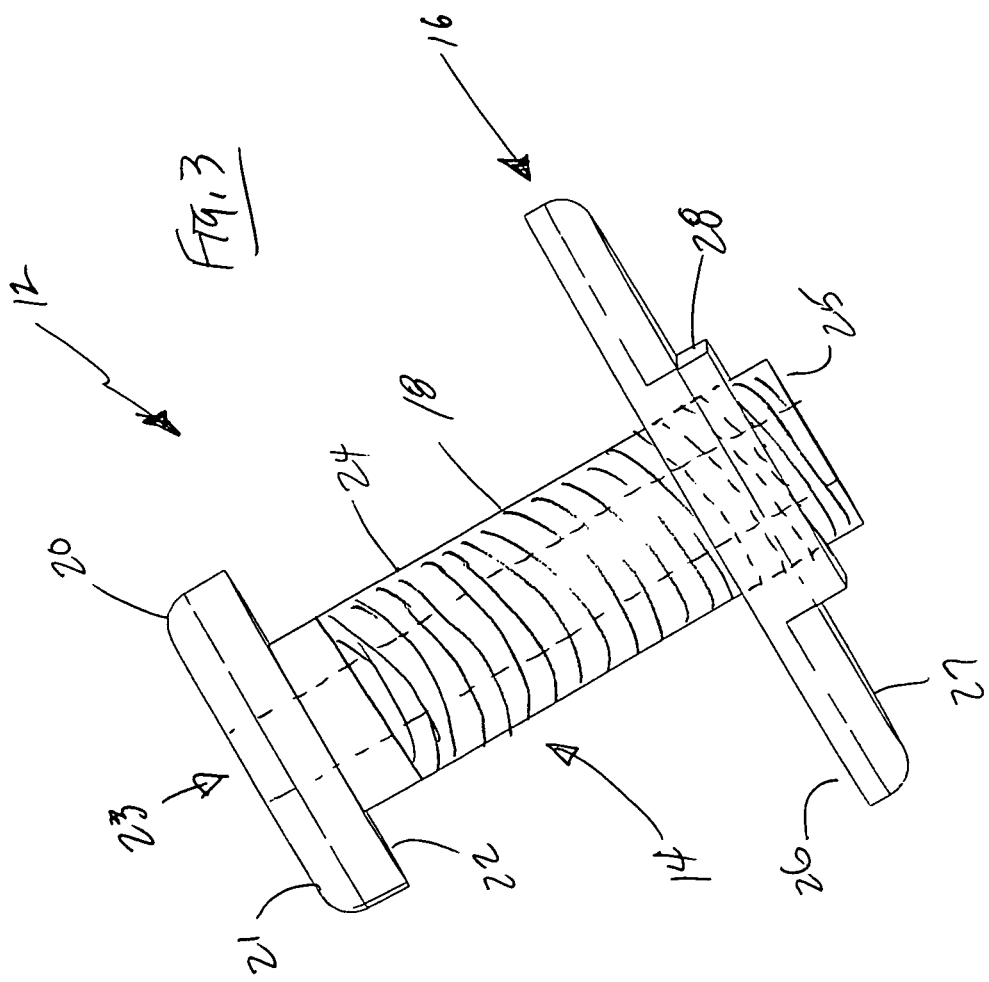

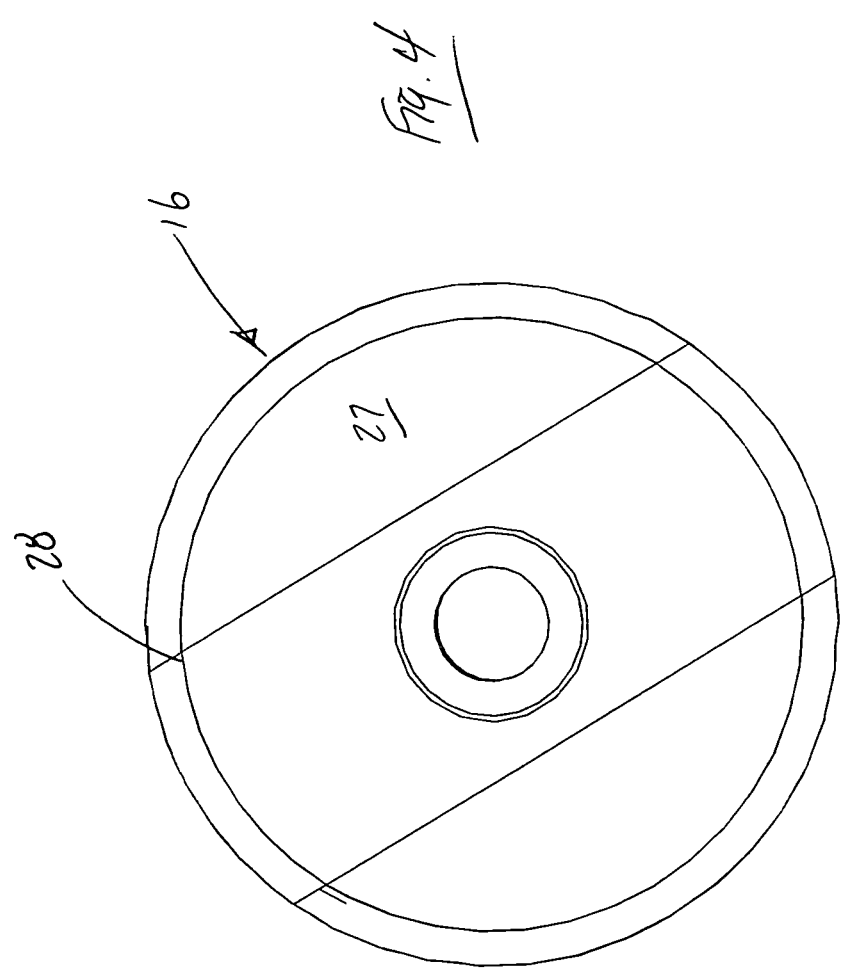

SOFT PADEYE

CROSS REFERENCE TO RELATED APPLICATIONS

This application claims the benefit of Provisional Application for Patent Ser. No. 61/402,745 filed on Sep. 7, 2010.

FIELD

The present version of these embodiments relate generally to the field of devices used to attach lines to the decks of boats or ships or other surfaces.

BACKGROUND

These embodiments relate to padeyes or devices used to attach ropes or lines to the decks of ships or boats, and more particularly the devices can also be used to hold a line near the deck of a boat or ship or any other flat surface.

Boats and ships use lines for many purposes. Many times these lines must be run to a certain area on the deck or below the deck for adjusting many devices on the ships or boats. Padeyes were developed as a means to hold a line in a certain position on the deck so that the users would know where to reach to get the line. Alternatively padeyes were used as a guide to run a line from one area on the deck to another area on the deck. The padeyes also help keep the lines from getting tangled or misplaced.

Typical padeyes are manufactured from a ferrous or non-ferrous material and are either a solid piece of material bolted to or through the deck or a u-shaped piece of material that was retained on both ends and bolted to or through the deck.

These traditional padeyes obviously stick up from the deck and boaters and sailors can step on or ram their feet into the padeyes as they are moving around on the deck. This can cause injury and/or discomfort when the crew are rushing on the deck to take care of their responsibilities.

For the foregoing reasons, there is a need for a padeye that does not protrude as far from the deck and that lessens the likelihood to cause potential injury or discomfort to the feet. There is also a need for a device that can be stepped upon without damaging it while still maintaining the functionality of the device.

SUMMARY

In view of the foregoing disadvantages inherent in the field of the traditional padeyes there is a need for a soft padeye.

A first objective of these embodiments is to provide a device that can hold or guide ropes or hold other deck hardware.

Another objective of these embodiments is to provide a device that can be stepped upon without injury to the device or the stepper.

It is yet another objective of these embodiments to provide a device that is relatively simple to install.

It is a still further object of these embodiments to provide a device that is at least as strong as the devices currently on the market.

These together with other objectives of these embodiments, along with various features of novelty which characterize these embodiments, are pointed out with particularity in this application forming a part of this disclosure. For a better understanding of these embodiments, the operating advantages and the specific objectives attained by its uses, reference should be had to the accompanying drawings, descriptive matter and claims in which there is illustrated a preferred embodiment.

BRIEF DESCRIPTION OF DRAWINGS

FIG. 1 shows a perspective view of one embodiment of a soft padeye installed in a deck with a line looped through it.

FIG. 2 shows a side perspective view of one embodiment of the soft padeye without the loop.

FIG. 3 shows a side view of one embodiment of a soft padeye without the loop.

FIG. 4 shows an end view of one embodiment of the fastener for the soft padeye.

DETAILED DESCRIPTION OF THE PREFERRED EMBODIMENTS

Referring to the drawings in detail wherein like elements are indicated by like numerals, there is shown in FIG. 1 a partial cutaway installed view of one embodiment of the padeye 12 installed in the deck 11. To install the padeye 12, the user would drill a hole in the deck sized as close to the diameter of the shaft 24 as possible. The shaft 24 has threads 18. The shaft 24 of the spindle 14 is inserted into the hole on the deck and the threaded hole 30 of fastener 16 is threaded onto the shaft 24 threads 18 securing the top 26 of the fastener 16 to the underside of the deck 11. This fixes the bottom 22 of the head 20 to the top of the deck 11. A box wrench or crescent wrench can be used on the flat 28 to secure the fastener 16.

Both ends of the loop 13 are inserted into the hole 23 on the top 21 of the spindle 14 above deck 11 to below deck 11. The two ends of loop 13 are then tied into a knot 17 where it exits the end 25 of the shaft 24. This secures the loop 13 in the padeye 12. The user can then attach line 15 or hardware through the loop 13 above deck 11.

FIG. 2 shows a perspective view of one embodiment of the padeye 12. The fastener 16 has flat 28 on the bottom 27 that facilitates the attachment of a tool (not shown) to tighten the top 26 of fastener 16 to the bottom of deck 11 and the bottom 22 of the head 20 to the top of the deck 11. This thereby secures the padeye 12 to the deck 11.

FIG. 3 shows a side view of one embodiment of the padeye 12. The size of the fastener 16 can be increased based upon the expected loading of the padeye 12. Since the loading of the padeye 12 is primarily in a direction up from the deck 11, the larger the fastener 16, the higher the potential loading allowable.

FIG. 4 shows a view of the bottom 27 of the fastener 16.

It will now be apparent to those skilled in the art that other embodiments, improvements, details and uses can be made consistent with the letter and spirit of the foregoing disclosure and within the scope of this application.

What is claimed is:

1. A device for securing line or rope to a flat surface, the device comprising:
   a spindle, the spindle having a head, the head having a top and a bottom, the head connected to a threaded shaft, the head and spindle having a hole there through, the threaded shaft inserted through the flat surface;
   a fastener, the fastener having a top and a bottom, the fastener having a threaded hole approximately in the center, a flat on the bottom, the fastener threaded to the shaft such that the bottom of the head and the top of the fastener is secured against the top and bottom of the flat surface;

a loop of rope, the loop having two ends, the ends of the loop inserted into the hole in the head and exiting the bottom of the shaft, the loop ends tied into a knot, the knot located exterior to the bottom of the shaft, the knot thereby preventing the loop from being pulled back into the bottom of the shaft; and the loop of the rope extending from the top of head and above the flat surface for insertion of the line thereby securing the line to the device.

2. A device for securing a line to a flat surface having a hole, the device comprising:

a spindle having a head and a shaft, the head having a top and a bottom and a hole through the center, the shaft having a top and a bottom, a hole through center and threads along the length;

the bottom of the head attached to the top of the shaft, the hole in the head concentric with the hole in the shaft;

a fastener, the fastener having a top and a bottom and a threaded hole, the threads of the fastener matching the threads of the shaft, a flat on the bottom of the fastener;

the shaft inserted through the hole in the flat surface, the fastener threaded onto the shaft and tightened thereby securing the bottom of the head to the top of the surface and the top of the fastener to the bottom of the surface;

a loop of line having two ends, the ends inserted into the hole in the head and the shaft exiting the bottom of the shaft, the ends tied into a knot whereby the knot cannot be pulled back into the shaft; and the line inserted through the loop and thereby secured to the flat surface.

3. A device for retaining a line to a surface having a hole, the device comprising:

a head having a top and a bottom, a hole, the hole located in the center of the head;

a shaft, the shaft having a top and a bottom, a hole, the hole located in the center of the shaft, threads along the length of the shaft;

the top of the shaft attached to the bottom of the head, the hole in the head and the hole in the shaft located concentric to one another;

a fastener, the fastener having a top and a bottom, a threaded hole, the threaded hole located approximately in the center of the fastener; a flat, the flat located on the bottom having the threaded hole located near the center;

a loop of line, the loop having two ends; and whereby the bottom of the shaft is inserted into the hole in the surface, the fastener is threaded to the shaft securing the bottom of the head to the top of the surface and the top of the fastener to the bottom of the surface, the ends of the loop inserted into the head to exit the bottom of the shaft, the ends knotted such that the ends cannot be pulled into the bottom of the shaft, the line run through the loop and thereby secured to the surface.

* * * * *